(12) United States Patent
Krog

(10) Patent No.: US 6,577,298 B2
(45) Date of Patent: Jun. 10, 2003

(54) DEVICE FOR OPERATING A MOUSE-OPERATED COMPUTER PROGRAM

(76) Inventor: Gabriel Wergeland Krog, Kampnes, N-1800 Askim (NO)

( * ) Notice: Subject to any disclaimer, the term of this patent is extended or adjusted under 35 U.S.C. 154(b) by 0 days.

(21) Appl. No.: 10/164,275

(22) Filed: Jun. 5, 2002

(65) Prior Publication Data

US 2003/0020689 A1 Jan. 30, 2003

Related U.S. Application Data

(63) Continuation-in-part of application No. 09/214,988, filed on Jan. 15, 1999, now abandoned.

(51) Int. Cl.[7] ................................................. G09G 5/08
(52) U.S. Cl. ....................... 345/161; 345/162; 345/163; 345/165; 345/160
(58) Field of Search ................................ 345/161, 163, 345/156, 165, 166, 168, 160, 157

(56) References Cited

U.S. PATENT DOCUMENTS 5,576,733 A * 11/1996 Lo ............................... 345/163
6,262,715 B1 * 7/2001 Sawyer ........................ 345/163

* cited by examiner

Primary Examiner—Richard Hjerpe
Assistant Examiner—Ali Zamani
(74) Attorney, Agent, or Firm—Rodman & Rodman

(57) ABSTRACT

A device for operating a mouse-operated computer program includes a base having an upwardly projecting handle firmly secured thereto. The handle may also be linked to the base for fixing in any desired position relative to the base. The handle includes an operating means on top of the handle and/or one of the sides of the handle, and/or on the actual base in order to provide signals which can control the position of the mouse pointer on a computer screen. Rolling balls or similar sliding means are provided on the underside of the base.

30 Claims, 3 Drawing Sheets

DEVICE FOR OPERATING A MOUSE-OPERATED COMPUTER PROGRAM This application is a continuation-in-part of U.S. Ser. No. 09/214,988, filed Jan. 15, 1999 now abandoned.

BACKGROUND OF THE INVENTION

The present invention relates to a device for operating a mouse-operated computer program as disclosed in the preamble of claim 1.

When operating a mouse-operated computer program it has hitherto been usual to use a flat object having push buttons for operation and a roller on the underside which controls the mouse pointer. These mouse-like articles have been given an ergometric shape so that they fit well in the hand, but during use the hand must of course be twisted from the natural position of rest, which causes constant tension in the elbow area. The use of such mice has been found to cause inflammation and pain in the arm when used over a long period of time. In order to avoid these static positions it has been recommended that the mouse should be used in different positions, and different types of underlying surfaces have been made which are supposed to give a better working posture, but none of these have proven to be satisfactory.

In order to overcome some of these drawbacks a so-called mouse pen has been developed, but this has not been found to give the desired result either with regard to a normal working posture which does not cause tension in the arm.

OBJECTS AND SUMMARY OF THE INVENTION

The objective of the present invention is to obviate the aforementioned problems of chronic pains and the inconveniences these entail. This is done by means of a device for operating mouse-operated computer programs, the characteristic features of which are disclosed in the specification and the claims. Additional features of the invention are disclosed in the remaining dependent claims.

By means of the device according to the claims there is provided a possibility of being able to work with mouse-operated computer programs without any anxiety about muscular tension and other pain since the hand will be in a normal position of rest without any twists of the arm, and the weight of the arm can rest fully on the device.

Since buttons are located at different points the user will be able to change fingers when operating icons or similar in the computer program. In this way, static use of the fingers is also avoided, and thus any muscular tension which might result in chronic conditions will, in a simple manner, be avoided.

The provision on the underside of the mouse of contact points in the form of rolling balls or sliding surfaces enables the device to be operated with ease of movement on the mouse pad in such a way that no extra strength will be necessary in order to move the mouse pointer on the screen. This means that the weight of the arm can rest on the device and that the usual small lift of the arm with subsequent muscular tension will disappear.

The invention will be described in more detail below with reference to the drawings, wherein.

DETAILED DESCRIPTION OF THE INVENTION

Figure 1:
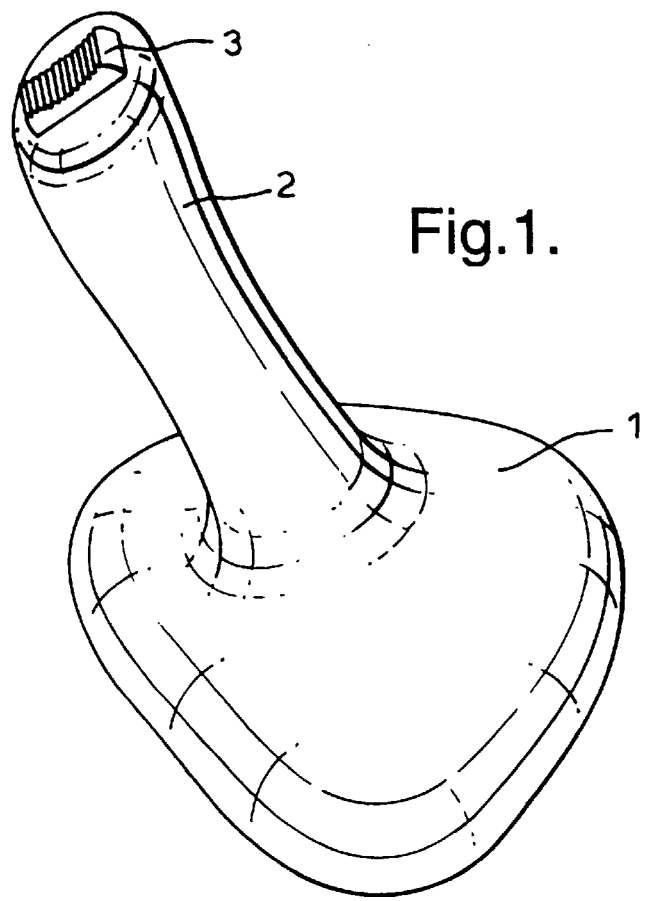
FIG. 1 is a perspective view of the device for operating a mouse-operated computer program.

FIG. 1 illustrates the device for operating mouse-operated computer programs, said device consisting of a base 1 with an upwardly projecting handle 2 secured thereto. On the top of the handle 2 there is provided a mouse-operating means in the form of, e.g., a toggle key 3, or also in the form of separate push buttons which can be operated by the user's thumb. However, the operating means 3 may be of any previously known embodiment of switches capable of actuating the mouse pointer in a computer program. Several operating means can also be provided on the handle and/or on the actual base, such as means 3' on the handle 2, (FIG. 3a) which can be reached by the user's various fingers in order thus to obtain relief.

On the perspective drawing the base 1 and the handle 2 are made in one piece. However, it will also be possible to make the handle so that it is linked to the base by means of link devices that are known per se, and can in a simple manner be secured in the desired position relative to the base. This is so because the device illustrated in FIG. 1 is intended for the average user, but there are also people who have certain twists relative to the normal plane as a result of previous fractures of the arm or other causes, and in this case the user will then be able to adjust the handle relative to the base to his particular normal position of the arm.

In the same way, it will also be possible for left-handed people to adjust the device for left-handed use as the handle 2 has a small tilt towards the left of the figure relative to the base plane, which will not be particularly convenient for a left-handed person.

What is essential is that the handle 2 is fixed relative to the base 1 during use, and that when the user grips around the handle 2, the wrist and the arm will be in the position in which there can occur no unnatural twists of the arm which may cause tension.

Figure 2:
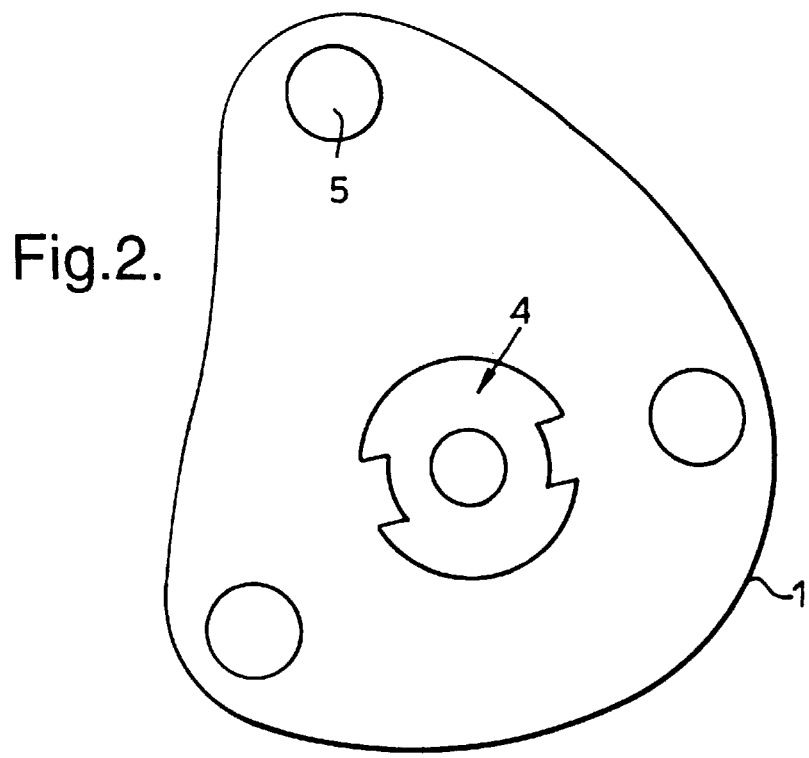
FIG. 2 is a view of the device in FIG. 1 from the underside.

In FIG. 2 the base 1 is shown seen from the underside. In the illustrated basic example the base is triangular in shape, but it will of course be possible to have a base of any other shape, the essential being that there is an operating ball 4 or similar which, during movement of the base 1 against the underlying surface, emits control signals to the mouse pointer on the screen. In the illustrated embodiment in FIG. 2, three balls 5 are provided which roll on the underlying surface during movement, the operating means 4 for the mouse pointer having a distance from any mouse pad relative to the balls so that it is in contact with the signal emitting means in the base. The balls 5 cause the device to roll without any significant resistance on the underlying surface, which in turn is instrumental in ensuring that the user does not strain himself too much. Sliding means that are known per se in the form of plastic elevations, or other suitable means which cause little friction, can of course also be used instead of balls 5. In the illustrated example, three contact points are provided, but it is of course also possible to provide more or fewer, although the three point device has been found to be particularly suitable. It will also be possible to make the whole base 1 in the form of a sliding surface.

Figure 3A:
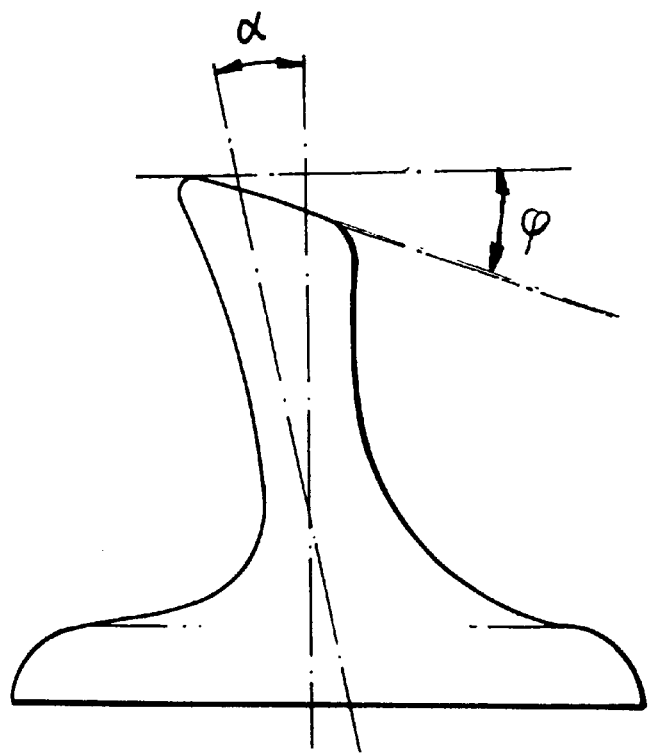
FIGS. 3a and 3b are schematic illustrations of the angles of the projecting part relative to the base seen from the side and from behind, respectively.
Figure 3B:
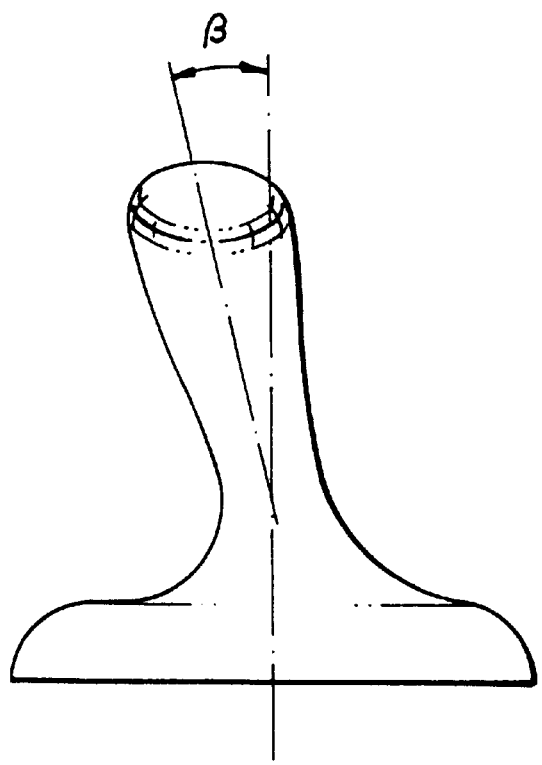

It has been proven that the most favourable tilt seen from the side is at an angle α of between 5 and 45 degrees, preferably 23 degrees, relative to a vertical line through the base, cf. FIG. 3*a,* and seen from behind, cf. FIG. 3*b,* an angle β of between 5 and 45 degrees, preferably 10 degrees, relative to a vertical line through the base.

The figures relate to a right-handed mouse, in a left-handed mouse the same angles will apply, but then in the opposite direction with reference to FIG. 3*b*.

FIG. 3*a* illustrates, seen from the side, also an angle φ of between 0 and 60 degrees at the top of the handle 2 relative to the horizontal plane. The angle φ is preferred to be 20 degrees.

Figure 4:
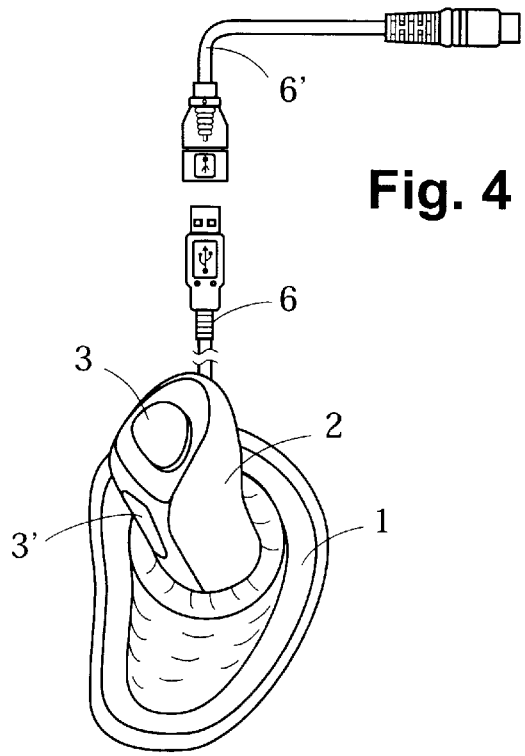
FIG. 4 is a view from above of the device.

FIG. 4 illustrates the device with USB connector lead 6 and with an optional PS2 connector lead 6' for connecting the device to a computer 7, e.g. a Personal Computer (PC).

Figure 5:
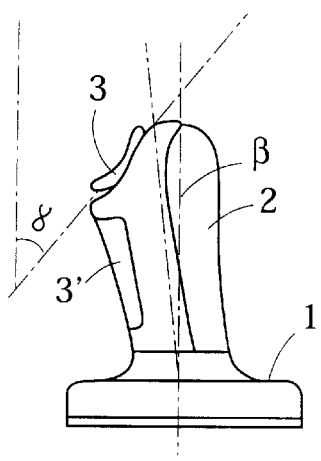
FIG. 5 is a rear view of the device.

FIG. 5 illustrates that as seen from behind, the operating means 3 is inclined relative to a horizontal plane by an angle γ being in the range of 0°–75°, preferably 30°–60°.

Figure 6:
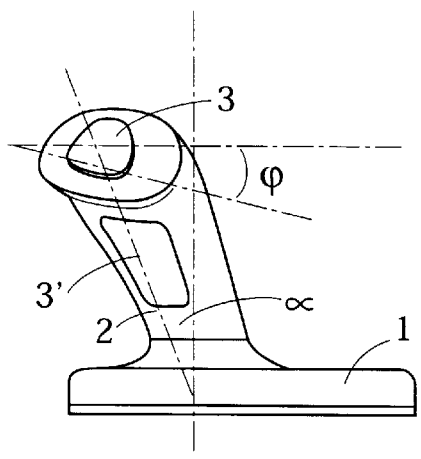
FIG. 6 is a side view of the device from one side.
Figure 8:
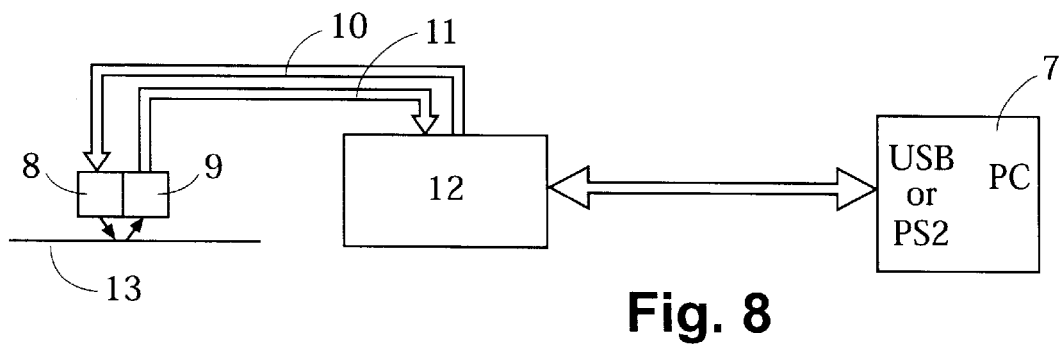
FIG. 8 is a simplified block diagram related to opto-electronic sensing of movement of the device relative to a surface.

FIG. 6 illustrates that the face of the operating means 3 is inclined downwardly and reardwardly relative to the horizontal by the above mentioned angle φ, and that the handle 2 is forwardly inclined by the above mentioned angle α.

Figure 7:
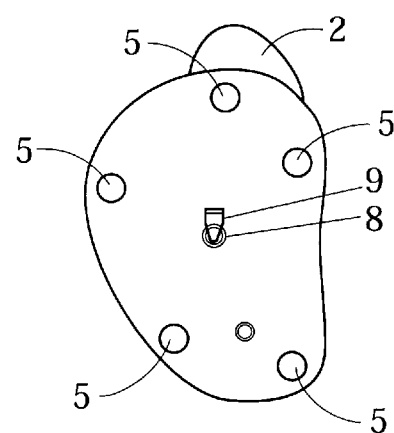
FIG. 7 is a view of the device from the underside, representing a modification of the embodiment of FIG. 2.

As shown on FIG. 7, on the the underside of the device there are slide-pads 5. The operating ball 4 or similar means shown on FIG. 2 and capable of sensing movement of the device relative to a surface, such as e.g. a desktop or mousepad, has in the embodiment of FIG. 7 been replaced by an opto-electronic means, whereby light emitted by a light emitter 8 is detected by a light receiving unit 9 capable of detecting two-dimensional movements of the device over a surface 13. Suitably the unit 9 could e.g. be a matrix-type detector, although any suitably type would be useful. The emitter 8 and the unit 9 are connected via links 10, 11 to an operating unit and processor 12 which is linked with the computer 7.

What is claimed is:

1. A device for operating a mouse-operated computer program comprising, at least one operating means on the underside of a base for providing movement signals to a mouse pointer or indicator on a computer display, and sliding means provided on the underside of the base, wherein the base has an upwardly extending handle secured thereto, said handle in a side view tilting in a forward direction, thereby forming an angle α of between 5 and 45 degrees relative to a vertical line through the base, said handle in a rear view forming an angle β of between 5 and 45 degrees relative to a vertical line through the base, and that at least one operating means is provided on a top face of the handle and/or one of the sides of the handle for functional operation of the mouse pointer or indicator, said top face forming an angle φ with a horizontal plane of between 0 and 60 degrees and wherein the sliding means is a plurality of rotatable balls.

2. A device according to claim 1, including toggle key means on said top face and wherein at least one operating means is provided on one of the sides of the handle in addition to said toggle key means on said top face.

3. A device according to claim 1 wherein said angle α is 23 degrees.

4. A device according to claim 1 wherein said angle β is 10 degrees.

5. A device according to claim 1, wherein said angle φ is 20 degrees.

6. A device according to claim 1 wherein said angle α is 23 degrees, said angle β is 10 degrees, and said angle φ is 20 degrees.

7. A device according to claim 6, wherein said top face having said toggle switch forms said angle φ with the horizontal when the device is seen from one side, and forms an angle γ of with a horizontal plane of between 0 and 75 degrees when the device is seen from the rear thereof.

8. A device according to claim 1 wherein said operating means is a roller ball means.

9. A device according to claim 1 wherein said operating means is an opto-electronic means.

10. A device according to claim 1 wherein said top face has a toggle switch and said toggle switch forms said angle φ with the horizontal when the device is seen one side, and forms an angle γ with a horizontal plane of between 0 and 75 degrees when the device is seen from the rear thereof.

11. A device acccording to claim 10 wherein angle γ is in the range of 30°–60°.

12. A device for operating a mouse-operated computer program comprising, at least one operating means on the underside of a base for providing movement signals to a mouse pointer or indicator on a computer display, and sliding means provided on the underside of the base, wherein the base has from a fraction of its surface area an upwardly extending handle secured thereto, any cross section of said handle substantially parallel to said base surface area being substantially smaller than said surface area of said base, enabling fingers of a gripping hand to grip around the handle, and said handle on its top face having toggle key means for operation by the thumb of said gripping hand, said handle in a side view tilting in a forward direction, thereby forming an angle α of between 5 and 45 degrees relative to a vertical line through the base, said handle in a rear view forming an angle β of between 5 and 45 degrees relative to a vertical line through the base, said top face forming an angle φ with a horizontal plane of between 0 and 60 degrees.

13. A device according to claim 12, wherein at least one operating means is provided on one of the sides of the handle in addition to said toggle key means on said top face.

14. A device according to claim 12 wherein the sliding means is a plurality of rotatable balls.

15. A device according to claim 12 wherein said angle α is 23 degrees.

16. A device according to claim 12 wherein said angle β is 10 degrees.

17. A device according to claim 12, wherein said angle φ is 20 degrees.

18. A device according to claim 12, wherein said angle α is 23 degrees, said angle β is 10 degrees, and said angle φ is 20 degrees.

19. A device according to claim 12 wherein said operating means is a roller ball means.

20. A device according to claim 12 wherein said operating means is an opto-electronic means.

21. A device according to claim 20 wherein angle γ is in the range of 30°–60°.

22. A device according to claim 1 wherein said to face has a toggle switch and said toggle switch forms said angle φ with the horizontal when the device is seen one side, and forms an angle γ with a horizontal plane of between 0 and 75 degrees when the device is seen from the rear thereof.

23. A device for operating a mouse-operated computer program comprising, at least one operating means on the underside of a base for providing movement signals to a mouse pointer or indicator on a computer display, and sliding means provided on the underside of the base, wherein the base has from a fraction of its surface area an upwardly extending handle secured thereto, any cross section of said handle substantially parallel to said base surface area being substantially smaller than said surface area of said base, enabling fingers of a gripping hand to grip around the handle, and said handle on its top face having toggle key means for operation by the thumb of said gripping hand, said handle in a side view tilting in a forward direction, thereby forming an angle α of between 5 and 45 degrees relative to a vertical line through the base, said handle in a rear view forming an angle β of between 5 and 45 degrees relative to a vertical line through the base, said top face in a rear view forming an angle γ with a horizontal plane of between 0 and 75 degrees.

24. A device according to claim 23, wherein at least one operating means is provided on one of the sides of the handle in addition to said toggle key means on said top face.

25. A device according to claim 23 wherein the sliding means is a plurality of rotatable balls.

26. A device according to claim 23 wherein said angle α is 23 degrees.

27. A device according to claim 23 wherein said angle β is 10 degrees.

28. A device according to claim 23 wherein said operating means is a roller ball means.

29. A device according to claim 23 wherein said operating means is an opto-electronic means.

30. A device acccording to claim 23 wherein angle γ is in the range of 30°–60°.

* * * * *

UNITED STATES PATENT AND TRADEMARK OFFICE
CERTIFICATE OF CORRECTION

PATENT NO. : 6,577,298 B2  
DATED : June 10, 2003  
INVENTOR(S) : Gabriel Wergeland Krog Page 1 of 1

It is certified that error appears in the above-identified patent and that said Letters Patent is hereby corrected as shown below:

<u>Title page,</u>
Item [76], change "Kampnes" to -- Kampenes --
Items [86], [87] and [30], add:
-- [86] PCT Filed: February 7 1997
    PCT No.: PCT/NO97/00038
    § 371 Date: January 15, 1999
    § 102(e) Date: January 15, 1999 --
-- [87] PCT Publication No.: WO98/06026
    PCT Publication Date: February 12, 1998 --
-- [30] Foreign Application Priority Data
    August 1, 1996 (NO) ............... PCT/NO96/00197 --

<u>Column 3,</u>
Line 23, change "horizontal" to -- vertical --

<u>Column 4,</u>
Lines 9, 18 and 63, change "horizontal" to -- vertical --
Lines 17 and 62, change "seen one" to -- seen from one --
Line 60, change "claim 1" to -- claim 12 --

<u>Column 5,</u>
Line 15, change "horizontal" to -- vertical --

Signed and Sealed this

Twenty-first Day of October, 2003

JAMES E. ROGAN
*Director of the United States Patent and Trademark Office*